(12) United States Patent
Kwon et al.

(10) Patent No.: US 8,468,949 B2
(45) Date of Patent: Jun. 25, 2013

(54) VACUUM DIVISION MANAGEMENT SYSTEM AND VACUUM BLOCKING SCREEN DEVICE FOR TUBE RAILWAY SYSTEM

(75) Inventors: Sam-Young Kwon, Daejeon (KR); Hyung-Chul Kim, Gyeonggi-do (KR); Dong-Wook Jang, Seoul (KR); Yong-Hyeon Cho, Seoul (KR); Hyung-Woo Lee, Seoul (KR); Chan Bae Park, Gyeonggi-do (KR)

(73) Assignee: Korea Railroad Research Institute, Gyeonggi-Do (KR)

( * ) Notice: Subject to any disclaimer, the term of this patent is extended or adjusted under 35 U.S.C. 154(b) by 0 days.

(21) Appl. No.: 13/146,383

(22) PCT Filed: Feb. 8, 2010

(86) PCT No.: PCT/KR2010/000768
§ 371 (c)(1),
(2), (4) Date: Jul. 26, 2011

(87) PCT Pub. No.: WO2011/074739
PCT Pub. Date: Jun. 23, 2011

(65) Prior Publication Data
US 2011/0283914 A1 Nov. 24, 2011

(30) Foreign Application Priority Data

Dec. 17, 2009 (KR) .................. 10-2009-0126104

(51) Int. Cl.
*B65G 35/00* (2006.01)
(52) U.S. Cl.
USPC .......................................... 104/155; 104/156

(58) Field of Classification Search
USPC ................. 104/138.1, 156, 159, 27, 28, 23.2, 104/130.07; 414/236, 237, 331.04
See application file for complete search history.

(56) References Cited

U.S. PATENT DOCUMENTS 1,061,035 A * 5/1913 Batcheller ...................... 104/119
3,403,634 A * 10/1968 Crowder .................... 104/138.1

(Continued)

FOREIGN PATENT DOCUMENTS

| JP | 02-054773 U | 4/1990 |
| JP | 03-232624 A | 10/1991 |

(Continued)

OTHER PUBLICATIONS

English Language Abstract of JP 03-232624 A, Oct. 16, 1991.

(Continued)

*Primary Examiner* — Jason C Smith
(74) *Attorney, Agent, or Firm* — Rabin & Berdo, P.C.

(57) ABSTRACT

Provided is a tube railway system that reduces noise and air resistance using a sealed evacuated tube as a passage for a tube railway, thereby allowing a train to run at a higher speed. A vacuum division management system and a vacuum blocking screen device for a tube railway system required to maintain vacuum are provided, in which the vacuum blocking screen device is operated to rapidly block a passage for a tube railway in response to an operation signal, is installed at every certain section or at a designated section of the tube railway, and is operated in a specific section when a vacuum maintenance problem occurs, or when the vacuum needs to be released, or when the train needs to stop immediately, thereby allowing the specific section to be isolated from other sections to have a degree of vacuum different from those of the other sections.

21 Claims, 19 Drawing Sheets

U.S. PATENT DOCUMENTS

| | | | | |
|---|---|---|---|---|
| 3,404,638 A * | 10/1968 | Edwards | | 104/156 |
| 3,601,158 A * | 8/1971 | Edwards | | 138/106 |
| 3,734,428 A * | 5/1973 | Alexandrov et al. | | 406/185 |
| 3,749,026 A * | 7/1973 | Carrasse | | 104/156 |
| 3,776,141 A * | 12/1973 | Gelhard et al. | | 104/123 |
| 3,797,405 A * | 3/1974 | Carstens et al. | | 406/105 |
| 3,954,064 A * | 5/1976 | Minovitch | | 104/138.1 |
| 3,985,081 A * | 10/1976 | Sullivan, II | | 104/23.2 |
| 3,999,487 A * | 12/1976 | Valverde | | 104/138.1 |
| 4,017,039 A * | 4/1977 | Carstens | | 406/105 |
| 4,018,410 A * | 4/1977 | Renaux | | 705/7.12 |
| 4,023,500 A * | 5/1977 | Diggs | | 104/138.1 |
| 4,036,146 A * | 7/1977 | Tyus | | 104/307 |
| 4,072,109 A * | 2/1978 | Kovanov et al. | | 104/138.1 |
| 4,075,947 A * | 2/1978 | Soschenko et al. | | 104/23.2 |
| 4,108,077 A * | 8/1978 | Laing | | 104/156 |
| 4,113,202 A * | 9/1978 | Ueno | | 406/185 |
| 4,166,419 A * | 9/1979 | Ardeleanu | | 104/138.1 |
| 4,182,243 A * | 1/1980 | Ceauselu | | 104/138.1 |
| 4,347,791 A * | 9/1982 | Mandros | | 104/156 |
| 4,458,602 A * | 7/1984 | Vandersteel | | 104/138.1 |
| 4,630,961 A * | 12/1986 | Hellwig | | 404/1 |
| 4,703,697 A * | 11/1987 | Bell | | 104/23.1 |
| 4,841,871 A * | 6/1989 | Leibowitz | | 104/23.1 |
| 4,881,469 A * | 11/1989 | Hirtz | | 104/138.1 |
| 4,899,665 A * | 2/1990 | La Sorte | | 104/23.1 |
| 4,940,368 A * | 7/1990 | Marcu | | 406/79 |
| 5,253,590 A * | 10/1993 | Marusak | | 104/138.1 |
| 5,537,929 A * | 7/1996 | Miura et al. | | 104/156 |
| 5,720,363 A * | 2/1998 | Kipp | | 186/55 |
| 5,909,710 A * | 6/1999 | Cummins | | 104/23.2 |
| 5,950,543 A * | 9/1999 | Oster | | 104/138.1 |
| 6,178,892 B1 * | 1/2001 | Harding | | 104/155 |
| 6,279,485 B1 * | 8/2001 | Schlienger | | 104/156 |
| 6,318,274 B1 * | 11/2001 | Park | | 104/88.02 |
| 6,418,856 B2 * | 7/2002 | Hossfield et al. | | 104/130.01 |
| 6,644,209 B2 * | 11/2003 | Cummins | | 104/156 |
| 6,810,817 B1 * | 11/2004 | James | | 104/88.04 |
| 6,877,439 B2 * | 4/2005 | Chapman | | 104/118 |
| 7,138,596 B2 * | 11/2006 | Pippin et al. | | 209/584 |
| 8,006,625 B2 * | 8/2011 | Yang | | 104/138.1 |
| 2003/0010872 A1 * | 1/2003 | Lewin et al. | | 246/122 R |
| 2003/0101896 A1 * | 6/2003 | Cummins | | 104/156 |
| 2009/0101040 A1 * | 4/2009 | Yang | | 104/138.1 |
| 2011/0283914 A1 * | 11/2011 | Kwon et al. | | 104/138.1 |

FOREIGN PATENT DOCUMENTS

| | | |
|---|---|---|
| KR | 10-2008-0007228 A | 1/2008 |
| WO | WO 92-04218 A1 | 3/1992 |

OTHER PUBLICATIONS

English Language Abstract of KR 10-2008-0007228 A, Jan. 17, 2008.

International Search Report of PCT/KR2010/000768 mailed on Jan. 28, 2011.

* cited by examiner

VACUUM DIVISION MANAGEMENT SYSTEM AND VACUUM BLOCKING SCREEN DEVICE FOR TUBE RAILWAY SYSTEM

CROSS-REFERENCE TO RELATED APPLICATIONS

The present application claims priority under 35 U.S.C. §119 to Korean Application No. 10-2009-0126104, filed on Dec. 17, 2009.

BACKGROUND OF THE INVENTION

1. Field of the Invention

The present invention relates, in general, to a tube railway system that reduces noise and air resistance using a sealed evacuated tube as a railway passage, thereby allowing a train to run at a very high speed and, more particularly, to a vacuum division management system and a vacuum blocking screen device for the tube railway system required to maintain vacuum (about ⅓ to about 1/1000 of atmospheric pressure), in which the vacuum blocking screen device is installed at every certain section or at a designated section of a tube railway to rapidly block a passage of a tube railway train according to an operation signal. The vacuum blocking screen device is operated in a specific section of the tube railway when a vacuum maintenance problem occurs, or when the vacuum needs to be released, for instance, due to maintenance repair, or when the train needs to stop immediately, such that the specific section is isolated from the other sections to have a degree of vacuum different from those of the other sections.

2. Description of the Related Art

Tube railways are utilized to implement an ultra high-speed train system. Tube railways refer to means of transportation in which a train travels in a sealed evacuated track space.

The train travelling on the tube railway includes a magnetic levitation (Maglev) train or a wheeled train. Trains employing other propellant systems can also travel on the tube railway.

When a sealed evacuated tube is used as a tube railway passage noise and air resistance can be reduced.

Tube railways generally have a circular cross-section having a diameter of about 4 to about 10 meters, or a quadrilateral or polygonal cross section having a similar size, and have a structure in which top and bottom lines are individually enclosed by the tube railway passage. The degree of vacuum in the passage is generally a negative pressure that ranges from about ⅓ to about 1/1000 of atmospheric pressure.

Since a train compartment in which passengers are located must maintain the atmospheric pressure, the train for the tube railway must be sealed. To this end, the train is equipped with a sealing system.

In the tube railway system, the tube is isolated from the atmosphere, and its interior must be maintained under vacuum. If the vacuum is broken at a certain part of the tube, the vacuum of other parts of the tube physically connected thereto is also broken. A speed at which the vacuum is released, i.e., a speed at which the vacuum is broken, is approximate to the speed of sound, i.e., about 1224 km/h.

Thus, if any part of the tube is damaged and the vacuum begins to be released, it affects other part of the tube that maintains the vacuum state. To prevent this phenomenon, it is necessary to physically isolate the corresponding part of the tube. Otherwise, leakage of the vacuum in any part affects an entire interior of the tube, so that the train must stop operating or travel at a low speed throughout a service route. Further, to increase the degree of vacuum, the operating time and cost of a vacuum pump greatly increase.

Further, when tube railway equipment is damaged, and thus workers are required to directly enter the tube railway to repair the damaged tube railway equipment, it is efficient to release the vacuum only in the corresponding section to be repaired to return to the atmospheric pressure. To this end, there exists a need for a system in which the tube railway is divided into sections, each section being provided with equipment capable of blocking the release of the vacuum.

SUMMARY OF THE INVENTION

In the tube railway, when tube railway equipment is damaged, and thus workers are required to directly enter the tube railway to repair the damaged tube railway equipment, it is undesirable to release the vacuum from the entire tube railway to recover to the atmospheric pressure. If the tube railway is provided with equipment that can isolate an individual section of a tube railway from the other sections, repair efficiency can be enhanced because the vacuum only in the corresponding section can be released.

The present invention is directed to provide a vacuum division management system for a tube railway system in which a vacuum blocking screen device is additionally installed in every certain section or in designated sections or parts of a tube railway, and is operated in a specific section from which vacuum leaks out, to isolate only the specific section from the other sections so that normal operation of a train is not affected and rapid maintenance of the specific section is enabled.

Further, the present invention is directed to provide a vacuum division management system for a tube railway system which serves as an auxiliary braking means in which, when a train in operation incurs mechanical problems and must be immediately stopped, a vacuum blocking screen device is driven in front of and behind a section of a tube railway where the train is located to create a separate closed spatial region, release the vacuum from the section where the train is in operation, and generate air resistance against the train to immediately stop the train.

In an aspect, the present invention provides a vacuum division management system for a tube railway system in which a train travels in a sealed evacuated track space.

The vacuum division management system includes: a vacuum blocking screen device that is installed in every designated section or station of a tube railway, folds a blocking screen so as not to obstruct the traveling of a train under normal operating conditions of the train, unfolds the blocking screen to physically block the tube railway so as to prevent the propagation of vacuum when it is necessary to block the tube railway, folds the unfolded blocking screen to return to its original standby position so as to restore the tube railway into the normal operating conditions that do not obstruct the traveling of the train; a vacuum release valve means for releasing the vacuum from each section of the tube railway, a vacuum establishment means for making the vacuum for each section of the tube railway; a pressure sensing means for sensing pressure in each section of the tube railway; and a controller that monitors conditions of the tube railway and operating conditions of the train and controls operation of the vacuum blocking screen device on the basis of the monitored information and control operation of a manager.

Also, in another aspect, the present invention provides a vacuum division management system for a tube railway system in a sealed evacuated track space, the vacuum split management system comprising: a vacuum blocking screen device installed in each designated section of a tube railway, configured to allow a train to pass therethrough in a normal operation mode, and configured to block a passage of the tube railway in an abnormal operation mode to provide vacuum in a designated section, such that the designated section blocked by the vacuum blocking screen device has a degree of vacuum being different from that of other sections or is released from vacuum; and a controller configured to monitor conditions of the tube railway and operating conditions of the train, and configured to control operation of the vacuum blocking screen device based on the monitored conditions or a control operation of a train manager.

As described above, in the tube railway system according to the present invention, when the vacuum begins to be broken in a certain part of the tube, the corresponding part of the tube can be isolated from other parts maintaining a vacuum pressure to form a separate space to prevent the propagation of vacuum leakage. Therefore, interruption to the traveling of the train may be minimized, a working space of which vacuum is broken is reduced, and time and costs for repair or maintenance is reduced.

Further, in the tube railway, when tube railway equipment is damaged, and thus workers need to directly enter the tube railway to repair the damaged tube railway equipment, it is unreasonable to release the vacuum from the entire tube railway to the atmospheric pressure. If the tube railway is provided with equipment that can isolate an individual section from the other sections, it is efficient because the vacuum can be released only from the corresponding section.

Further, it is possible to separately release the vacuum only from the section where the train is located. Thus, the vacuum division management system can be usefully used as an auxiliary braking means in which, when the train in operation incurs mechanical problems and needs to be immediately stopped, the vacuum in only the corresponding section is released to generate air resistance to immediately stop the train. Accordingly, it is possible to ensure the safety of passengers and to reinforce emergency management capacity.

Thus, the present invention is advantageous in many aspects such as, for example, train operation, maintenance respect, or safety.

As another application of the vacuum division management system, when tube railway passages having different degrees of vacuum are interconnected or when a tube railway passage under vacuum is connected to an ordinary railway passage under atmospheric pressure, the vacuum division management system can be installed at an interface station serving as a boundary therebetween.

BRIEF DESCRIPTION OF DRAWINGS

The objects, features and advantages of the present invention will be more apparent from the following detailed description in conjunction with the accompanying drawings, in which:

FIGS. 4 through 7 show configuration of a vacuum blocking screen device employed in a Maglev train according to an exemplary embodiment of the present invention, wherein FIGS. 4 and 5 show a tube railway in which a blocking screen is folded, wherein FIG. 4 is a cross-sectional view of the tube railway and FIG. 5 is a longitudinal sectional view of the tube railway; and FIGS. 6 and 7 show a tube railway in which a blocking screen is unfolded, wherein FIG. 6 is a cross-sectional view of the tube railway and FIG. 7 is a longitudinal sectional view of the tube railway;

FIGS. 8 through 11 show configuration of a vacuum blocking screen device employed in a wheeled train according to an exemplary embodiment of the present invention, wherein FIGS. 8 and 9 show a tube railway in which a blocking screen is folded, wherein FIG. 8 is a cross-sectional view of the tube railway and FIG. 9 is a longitudinal sectional view of the tube railway;

FIGS. 10 and 11 show a tube railway in which a blocking screen is unfolded, wherein FIG. 10 is a cross-sectional view of the tube railway and FIG. 11 is a longitudinal sectional view of the tube railway;

FIGS. 14 through 16 are conceptual views for explaining configuration and operation of an outskirts structure, wherein FIG. 14 shows an open vent when viewed from the front, FIG. 15 shows a closed vent when viewed from the front, and FIG. 16 shows a vent when viewed from the top;

DETAILED DESCRIPTION OF EXEMPLARY EMBODIMENTS

Figure 1:
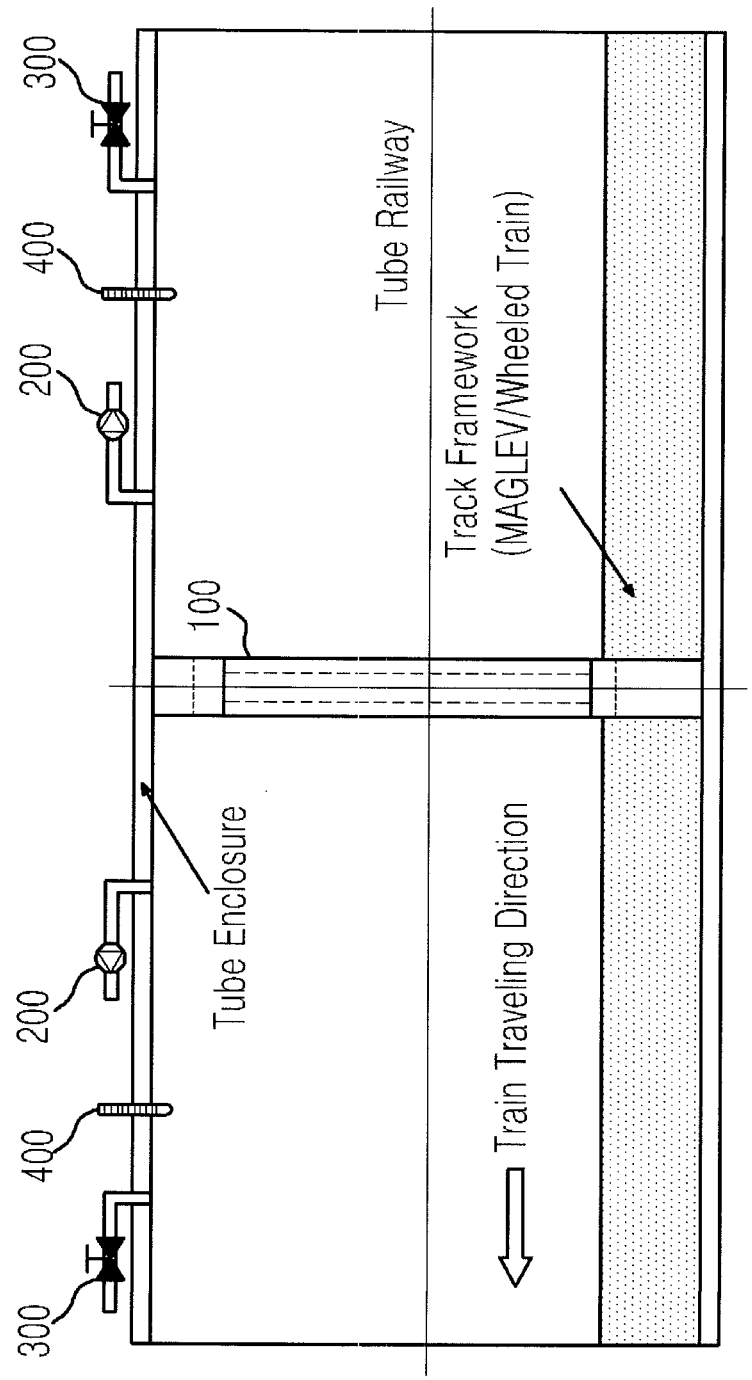
FIG. 1 shows a basic concept of a vacuum division management system and a vacuum blocking screen device for a tube railway system according to an exemplary embodiment of the present invention.

Hereinbelow, a vacuum division management system for a tube railway system of the present invention will be described in detail with reference to various embodiments shown in FIGS. 1 through 18.

A vacuum division management system for a tube railway system of the present invention includes: a vacuum blocking screen device 100 that is installed in every designated section or station of a tube railway, folds a blocking screen 110 so as not to obstruct the traveling of a train in normal operating conditions of the train, unfolds the blocking screen 110 to physically block the tube railway so as to prevent the propagation of vacuum when it is necessary to block the tube railway, folds the unfolded blocking screen 110 to return to its original standby position so as to restore the tube railway to the normal operating conditions that does not obstruct the traveling of the train; a vacuum pump 200 that makes vacuum for each section of the tube railway which is blocked by the vacuum blocking screen device 100; a vacuum release valve means 300 for releasing the vacuum from each section of the tube railway which is blocked by the vacuum blocking screen device 100; a pressure sensing means 400 for sensing pressure in each section of the tube railway which is blocked by the vacuum blocking screen device 100; and a controller 500 that monitors conditions of the tube railway and operating conditions of the train and controls operation of the vacuum blocking screen device 100 on the basis of the monitored information and control operation of a train manager.

The vacuum blocking screen device 100 includes: a blocking screen 110 that has, for instance, a quadrilateral shape and blocks a passage of a tube railway; an upper structure 120 that holds the blocking screen 110 in a standby state; a lower structure 130 that controls sealing between the blocking screen 110 and a lower surface of a tube railway passage after the blocking screen 110 is unfolded from the upper structure 120 to the lower surface of the tube railway passage; a vertical guide structure 140 positioned on left and right sides of the blocking screen 110 to pull down and unfold the blocking screen 110 and to pull up and fold the blocking screen 110 to return the blocking screen 110 to its original standby state; an outskirts structure 150 that is a structure for filling a residual space between an outer circumference of the blocking screen 110 and the tube railway passage, wherein the outskirts structure 150 includes a structure 151 that is defined by a shape of the residual space and a plurality of circular or elliptical ports 152 as air passages, the ports 152 can be shut by inflating balloons or opened by deflating the balloons; a blocking screen driver 160 that is installed in the vertical guide structure 140 to pull down the blocking screen 110 from the upper structure 120 to the lower structure 130 in order to unfold the blocking screen 110 and to pull up the blocking screen 110 from the lower structure 130 to the upper structure 120 in order to fold the blocking screen 110; a blocking screen boundary sealing device 170 that functions to inflate a balloon 172 to fill a boundary between the blocking screen 110 and the vertical guide structure 140 to prevent air from leaking out around the blocking screen 110 when the blocking screen 110, which is movable, is unfolded; and a latch device 180 that is installed on the upper structure 120 in order to cause the blocking screen 110, when folded under control of a controller 500, to be completely held and fixed in the upper structure 120.

The present invention relates to a vacuum zone management system or a vacuum division management system capable of rapidly blocking the passage of a tube railway having a circular shape (e.g., diameter of about 4 m to about 10 m) or a quadrilateral or polygonal shape of a similar size in a transverse direction by using an operation signal in a tube railway system, in which maintaining vacuum (about ⅓ to about 1/1000 of atmospheric pressure) is critical, and dividing and managing the tube railway passage into sections, each of which has the degree of vacuum different from one another.

The vacuum blocking screen device 100 is employed by the vacuum division management system to block the tube railway, and can be installed on the tube railway at every interval or at a place such as, for example, a station, that requires separate vacuum management.

The blocking screen 110 of the vacuum blocking screen device 100 is a means for effectively blocking the tube railway passage in a direction perpendicular (or substantially perpendicular) to the tube railway passage, and is designed such that its height and width is in a range that ensures a safe passage of the train operating at a normal speed, i.e. the blocking screen 100 is within a structure gauge.

The blocking screen 110 is folded and held in the upper structure 120 in the standby state where the train is in normal operation, and is unfolded in an unfolded state to block an entire quadrilateral space defined by the upper structure 120, the lower structure 130, and the vertical guide structure 140.

To this end, for example, the blocking screen 110 can comprise a nylon material coated with synthetic rubber, to prevent air from leaking out. Accordingly, the blocking screen can be smoothly folded due to light and soft characteristics, and has a certain extent of flexibility (elasticity) as well as desired level of strength.

Further, the blocking screen 110 may include two types: a single-layered screen type of a curtain shape and a bag type. In the case in which the blocking screen 110 employs the bag type as in FIG. 17, tethers are embedded in the blocking screen 110 so as to maintain a desired shape when the blocking screen 110 is opened.

The vertical guide structure 140 is a means for guiding the blocking screen 110 when the blocking screen 110 is unfolded or folded in a vertical direction. The vertical guide structure 140 is installed outside of a rolling stock gauge or a car gauge so as not to interfere with the travel of the train.

The lower structure 130 is a means for gripping the blocking screen 110 when the blocking screen 110 is unfolded and for releasing the unfolded blocking screen 110 to fold the blocking screen 110.

Further, the lower structure 130 is interfaced with a structure such as a track or a rail located at a lower end of the tube railway, and serves to seal the interfaced portion and a surface line joined with the block screen 110.

The track of the tube railway has a different shape and structure depending on whether the track is utilized for a magnetic levitation (Maglev) train or a wheeled train. Therefore, the lower structure 130 is preferably designed in an individual custom-made fashion to match the shape and structure of the track.

Figure 4:
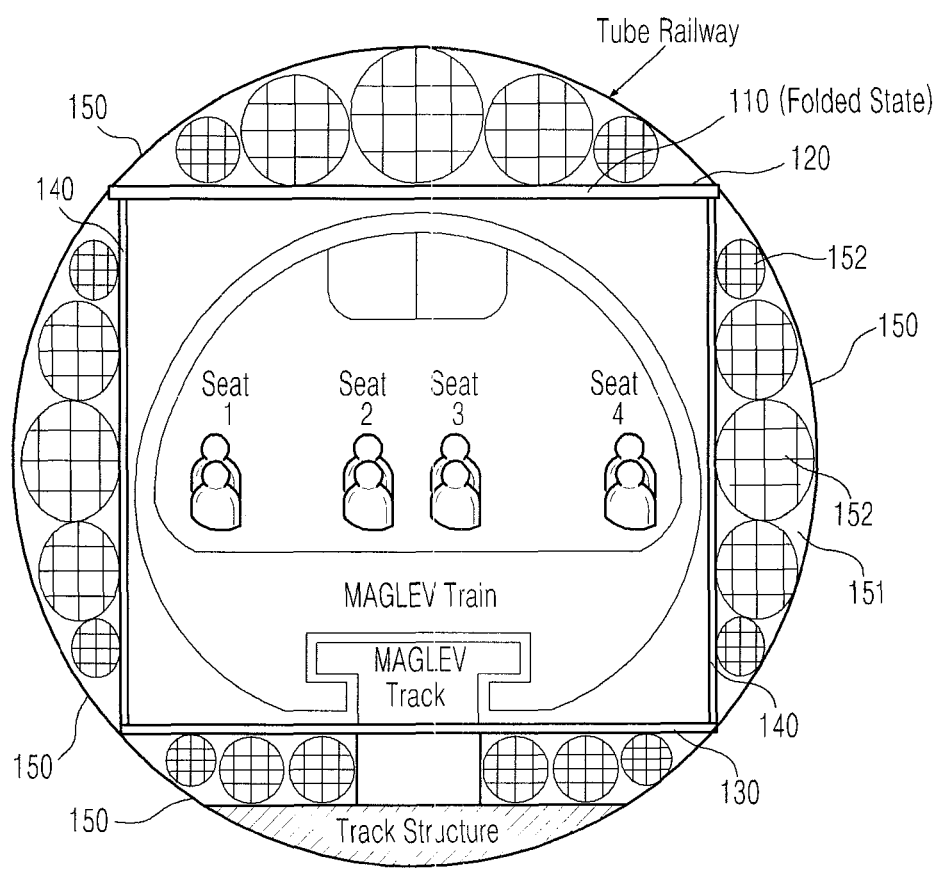
Figure 5:
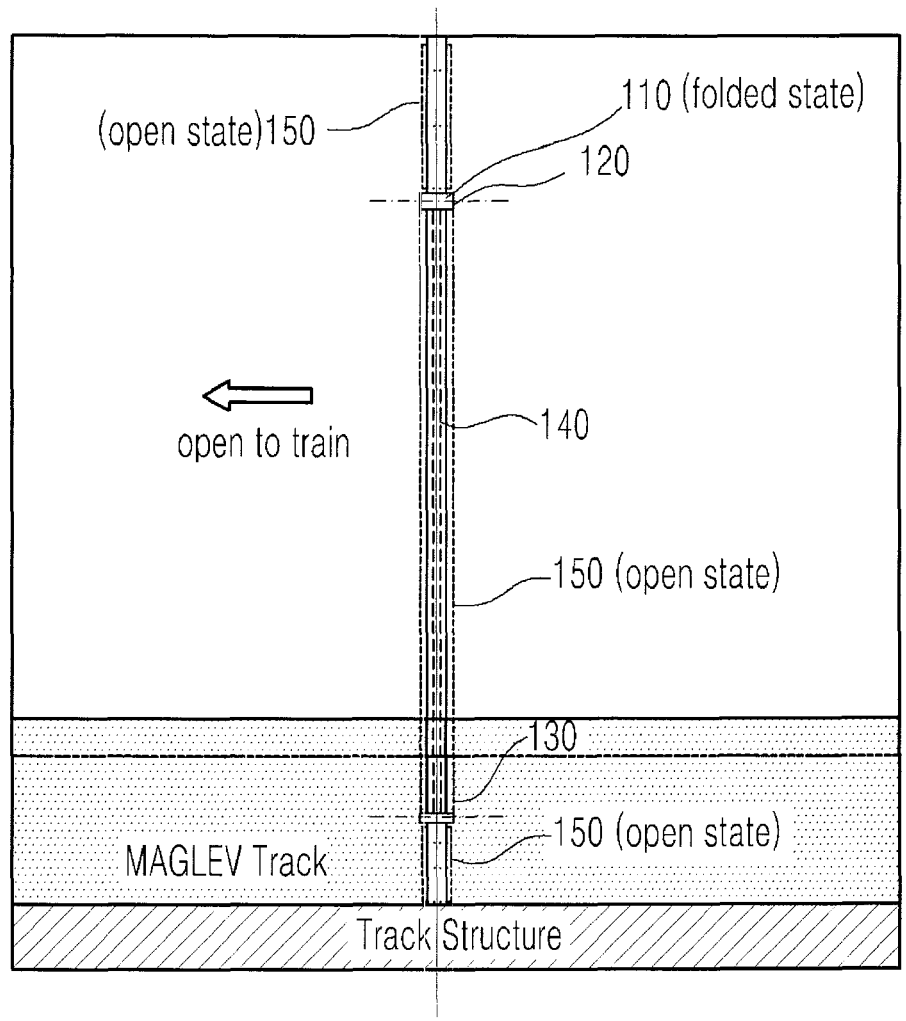

The lower structure 130 should be installed outside of the rolling stock gauge that is a maximum space where a train can travel. Since it is very difficult to seal the surface line joined with the track when the blocking screen 110 is unfolded, the track may be cut out beforehand by such a width that the blocking screen 110 can be unfolded without interfering the operation of the train, and then the lower structure 130 may be installed in the cut portion, as shown in FIGS. 4 and 5.

In this case, the track or the rail has a very brief discontinuous fragment at a place where the vacuum blocking screen device 100 is installed. Even if the track or the rail is disconnected, the train can travel without hindrance. However, depending on circumstances, an additional countermeasure may be considered.

The tube railway geometrically has a circular shape for the most part, while the blocking screen 110 has a quadrilateral shape to be located inside the circular tube railway. Thus, a residual space is present on the outskirts of the blocking screen 110, i.e. outside the upper structure 120, the vertical guide structure 140, and the lower structure 130. It is necessary to block a flow of air circulated in the residual space. Therefore, to this end, the outskirts structure 150 is provided.

Accordingly, the structure 151, which functions as a frame of the outskirts structure 150, is manufactured and installed to match a shape of the corresponding installation space. Alternatively, the structure 151 may be designed to assemble a plurality of sub-structures.

However, if the blocking screen 110 is designed in a big size so as to cover the entire cross section of the tube railway, the outskirts structure 150 may be eliminated.

When a train is in normal operation, train-induced wind is circulated in the tube railway. Thus, when the structure 151 blocks the passage, if in part, there is a possibility of interfering with the circulation of the train-induced wind. As such, in FIGS. 14 to 16, circular or elliptical holes 152 are bored in the structure 151, and balloons 153 are placed in the holes. Air can be rapidly injected into the balloons 153, thereby inflating the balloons to block the holes. Also, the air can be ejected from the balloons 153, thereby deflating the balloons to open the passage. The hole 152 can be, for example, a vent.

The vents 152 are generally controlled to be closed or opened simultaneously with an operation of the blocking screen 110. However, in an alternative embodiment, the vents 152 may be controlled to be closed or opened slightly earlier or later than the operation of the blocking screen 110.

Each vent 152 is given a space defined by left and right sides of lattices 154 when the balloon 153 is inflated in order to guide the inflated balloon 153 to completely fill the vent 152.

The blocking screen driver 160 is installed on the vertical guide structure 140, and is a means for driving the blocking screen 110 to be unfolded from the upper structure 120 or to be received in the upper structure 120. The blocking screen driver 160 is primary held in the vertical guide structure 140. However, an alternative form of a means for driving the blocking screen 110 may be installed on the upper structure 120 to interlock with the blocking screen driver 160 or with each other.

Figure 13:
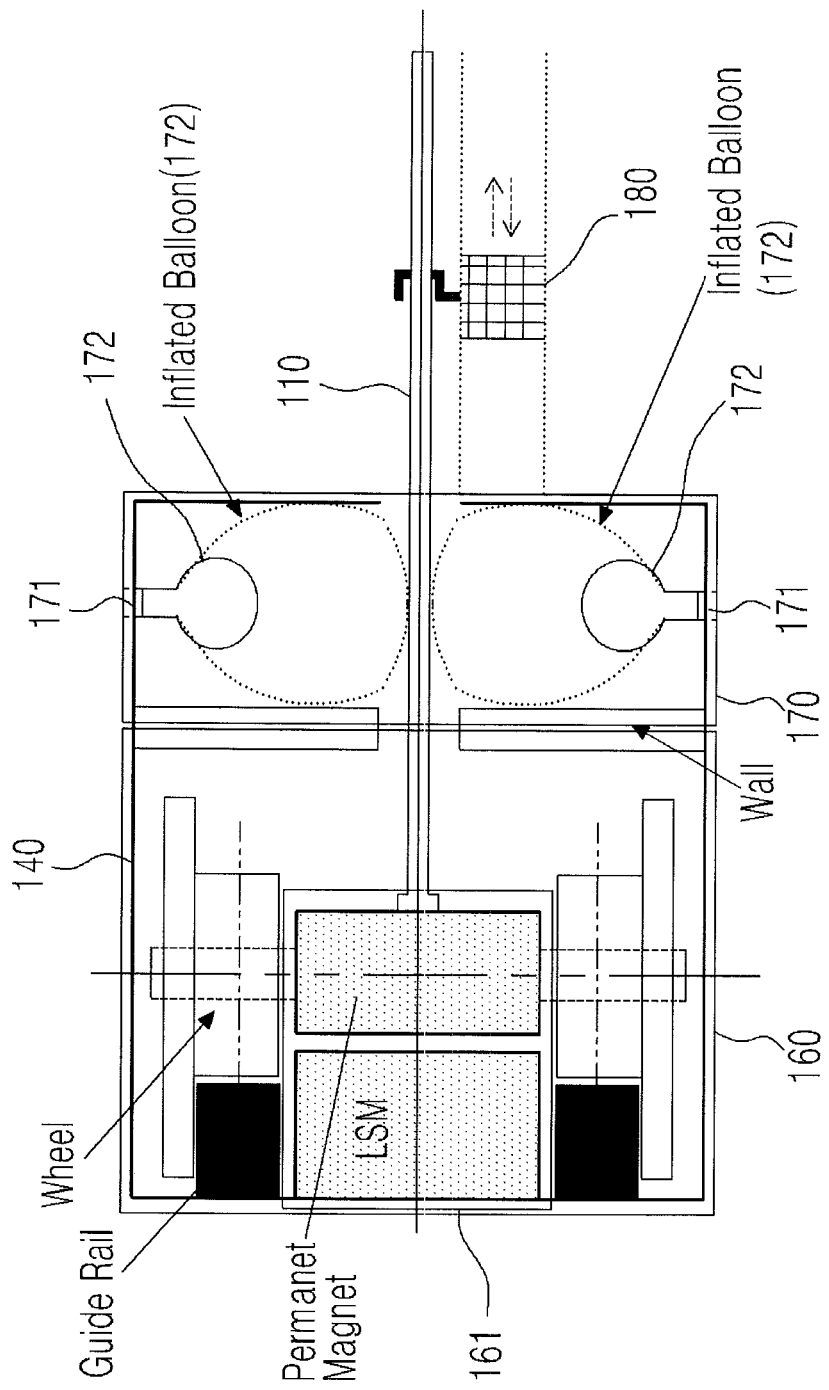
FIG. 13 shows configuration, structure, and operational principle of a vertical guide structure, a blocking screen, and a latch device according to an exemplary embodiment of the present invention.
Figure 14:
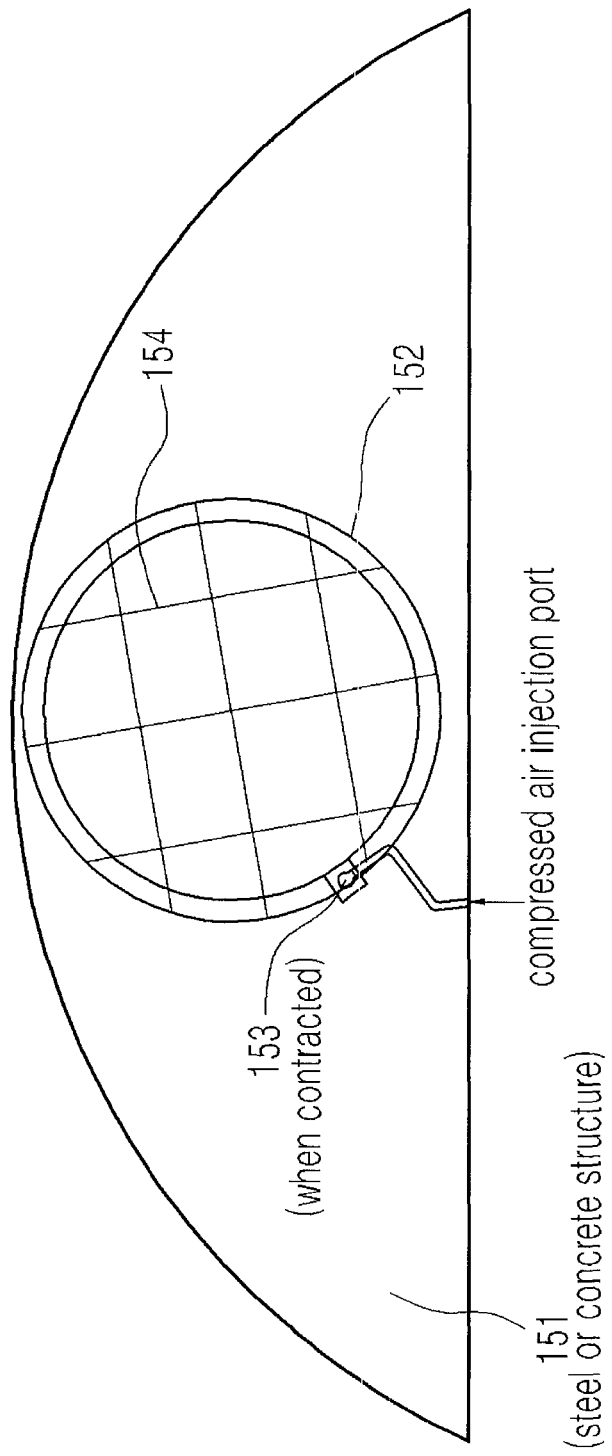
Figure 15:
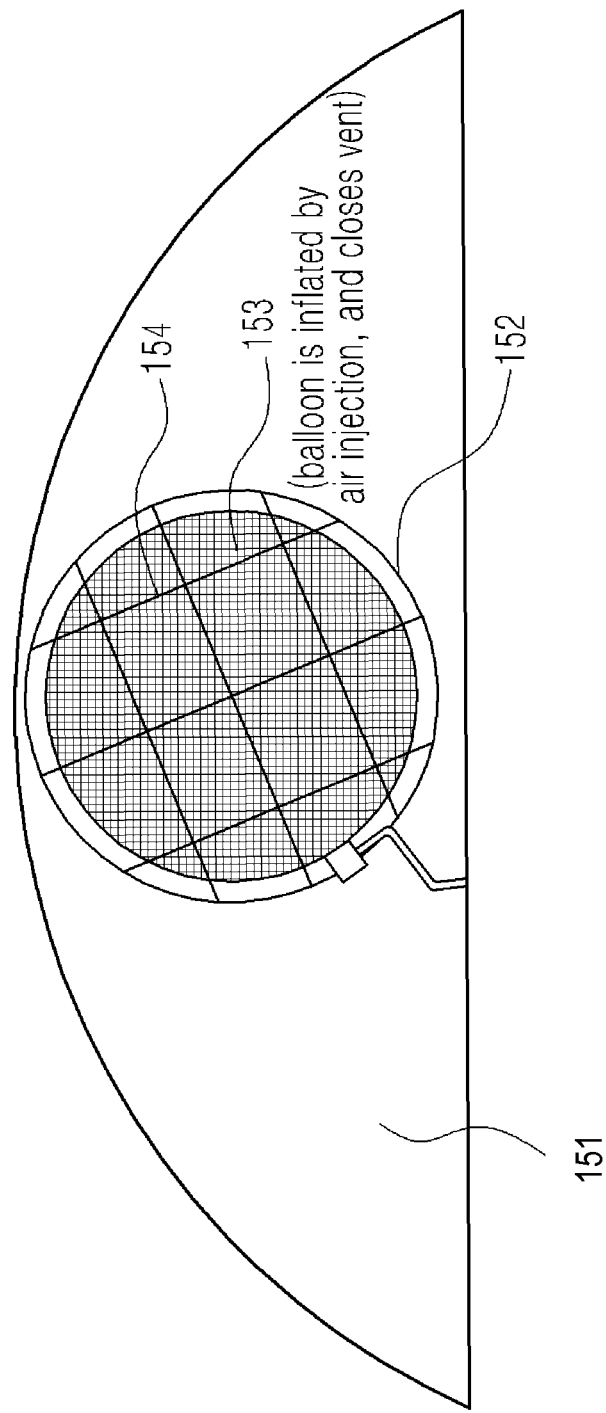
Figure 16:
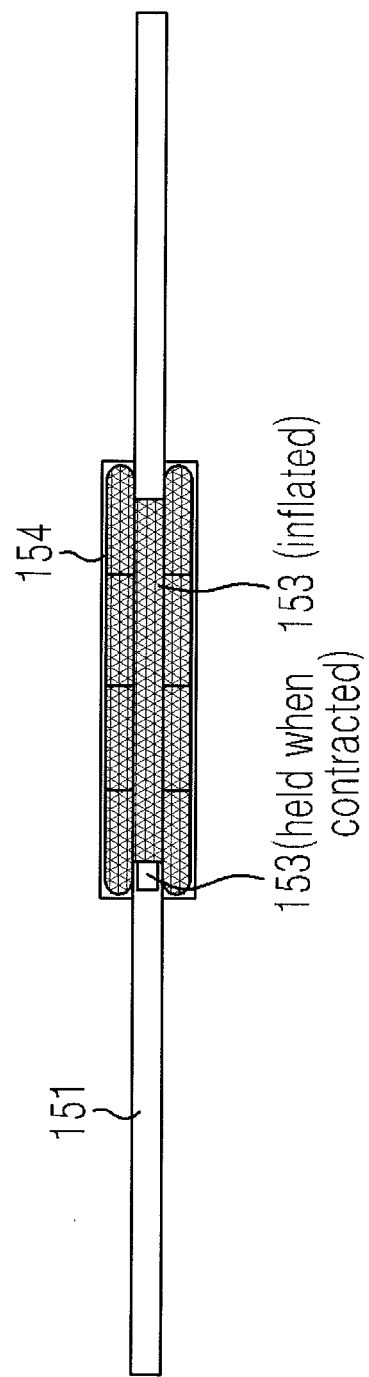

As shown in FIG. 13, the blocking screen driver 160 includes a linear synchronous motor (LSM) 161 in which winding for a stator is installed on the side of a guide rail of the vertical guide structure 140 and a permanent magnet is installed on a movable body, which is connected to a leading end of the blocking screen 110 and grip the blocking screen 110.

That is, the blocking screen driver 160 is configured such that the LSM 161 functions to transfer the blocking screen 110 with a rotator (i.e. the permanent magnet) connected to the blocking screen 110.

Alternatively, the blocking screen driver 160 can employ a gas diffusion method using the pyrochemical reaction of a propellant to unfold the blocking screen 110, a method the same as the operating principle of a vehicle airbag.

Figure 17:
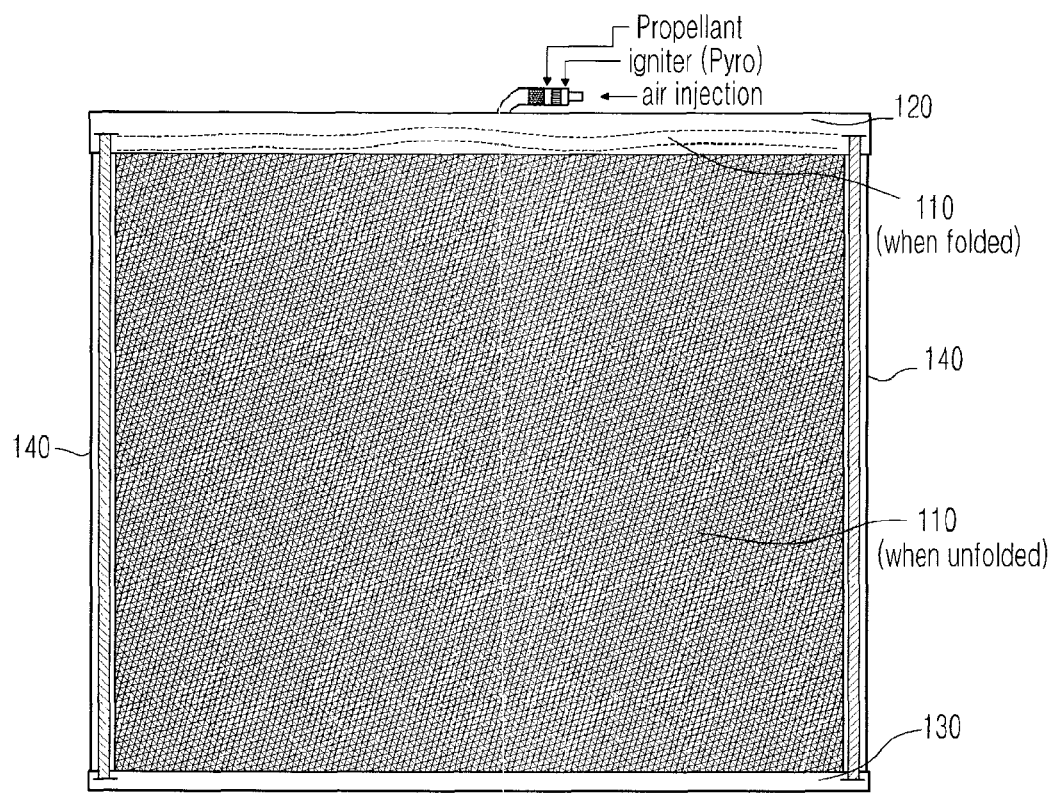
FIG. 17 shows a basic structure and configuration of an unfolded bag-type blocking screen of a vacuum blocking screen device according to an exemplary embodiment of the present invention.

This example, as shown in FIG. 17, includes a bag-type container used for the blocking screen 110, a gas generating means for causing a propellant (sodium azide ($NaN_3$)) to undergo a pyrochemical reaction to generate a large quantity of gas (azide type) or for activating gas compressed in the blocking screen along with the pyrochemical reaction of the propellant (hybrid type), and a gas injecting means for rapidly injecting a large quantity of nitrogen gas into the bag-type container used for the blocking screen, inflating the bag-type container used for the blocking screen at a high speed, and unfolding the bag-type container used for the blocking screen.

Further, as yet another example of the blocking screen driver 160, both the LSM and the gas inflating principle using the pyrochemical reaction of the propellant may be used in combination with each other to promptly unfold the blocking screen.

In contrast, a folding process of the blocking screen does not require a high speed compared to an unfolding process. As such, only the LSM can be used to fold the blocking screen.

A driving operation for the unfolding and folding processes of the blocking screen 110 may employ a linear induction motor (LEVI) or a combination of a rotary motor and a conveyer belt or a chain, which is relatively inexpensive compared to a method using the LSM.

Further, injection of compressed air can also be used as well as a variety of transfer systems and their modifications used in industrial fields.

The faster the unfolding process of the blocking screen 110 is, the higher performance is achieved. However, it is physically impossible to rapidly block the tube railway passage having a diameter of about 4 m to about 10 m without any delay. If the tube railway passage can be blocked within 0.05 seconds, the purpose of installing the vacuum blocking screen can be considered to be achieved. However, the purpose of the present invention can be achieved even at a lower speed of the blocking screen 110 when the blocking screen 110 is installed at an interface station between the vacuum tube and an atmospheric track.

A desired blocking speed is determined depending on, for example, a train speed, a size and a detailed design of the tube railway passage, a distance between the train and the blocking screen. The controller 500 for the vacuum blocking screen device determines a target blocking speed and controls based on the determined target blocking speed.

The blocking screen driver 160, which controls the process of folding the unfolded blocking screen 110 into the upper structure 120, may use various methods such as, for example, a method of rolling up the blocking screen by the rotation of gears or a method of folding up the blocking screen by converting the rotation of gears into a reciprocating motion.

The latch device 180 is used to place the folded blocking screen 110 within the upper structure 120, when the latch device 180 is pulled up to the upper structure 120 by the LSM 161 in the folding process.

Further, the latch device 180 is configured to latch the blocking screen 110 to prepare for the unfolding process next time. Here, a latch-type loop device moves along a horizontal direction of the upper structure 120 to place the folded blocking screen 110 into the upper structure 120, and holds the folded blocking screen 110 by a latch until a next instruction for the unfolding process is received.

The blocking screen boundary sealing device 170 is used to block an inflow of air into a boundary between the blocking screen 110 and the vertical guide structure 140 after the blocking screen 110 is unfolded. As shown in FIG. 13, the blocking screen boundary sealing device 170 introduces air through an air injection port 171 to inflate a balloon 172. The inflated balloon 172 fills a confined space within the vertical guide structure 140, thereby pressing the blocking screen 110 to seal the boundary of the blocking screen 110. When the blocking screen 110 is to be folded again, the air in the balloon 172 needs to be discharged. To this end, the blocking screen boundary sealing device 170 includes means for discharging air.

The blocking screen boundary sealing device 170 is installed in the lower structure 130, and is operated according to the same principle and method as the vertical guide structure 140.

As for a material of the balloon 153 provided for the blocking screen 110 or the outskirts structure 150 and a material of the balloon 172 of the blocking screen boundary sealing device 170, synthetic fiber (Spandex) similar to nylon or polyester may be used. In addition, a variety of applied materials may be used on the condition of exhibiting the same (or similar) properties, for instance, a fabric with Teflon coating.

Flexibility (or elasticity) and strength have a contradictory relationship to each other. Target values of the flexibility and the strength in the blocking screen 110 are found by solving an optimization function. The strength required for the blocking screen 110 should be enough to withstand an extreme pressure difference between the atmospheric pressure in one section and vacuum (about ⅓ to about 1/1000 of the atmospheric pressure) in the other section. The strength of the blocking screen is selected such that the blocking screen can withstand a pneumatic pressure applied thereto when the tube railway passage is blocked about 3 km in front of the train that runs at a high speed of about 600 to about 1000 km/h and then the atmospheric pressure applies to the tube, thereby inflating the tube by up to about 3 m. Further, the strength of the blocking screen 110 is selected such that the blocking screen can be torn when a train collides with the blocking screen to ensure the safety of passengers.

The latch device 180 is a means for completely holding and fixing the blocking screen 110, when folded, in the upper structure 120, and is installed on the upper structure 120. The latch device 180 is operated under control of the controller 500.

Figure 18:
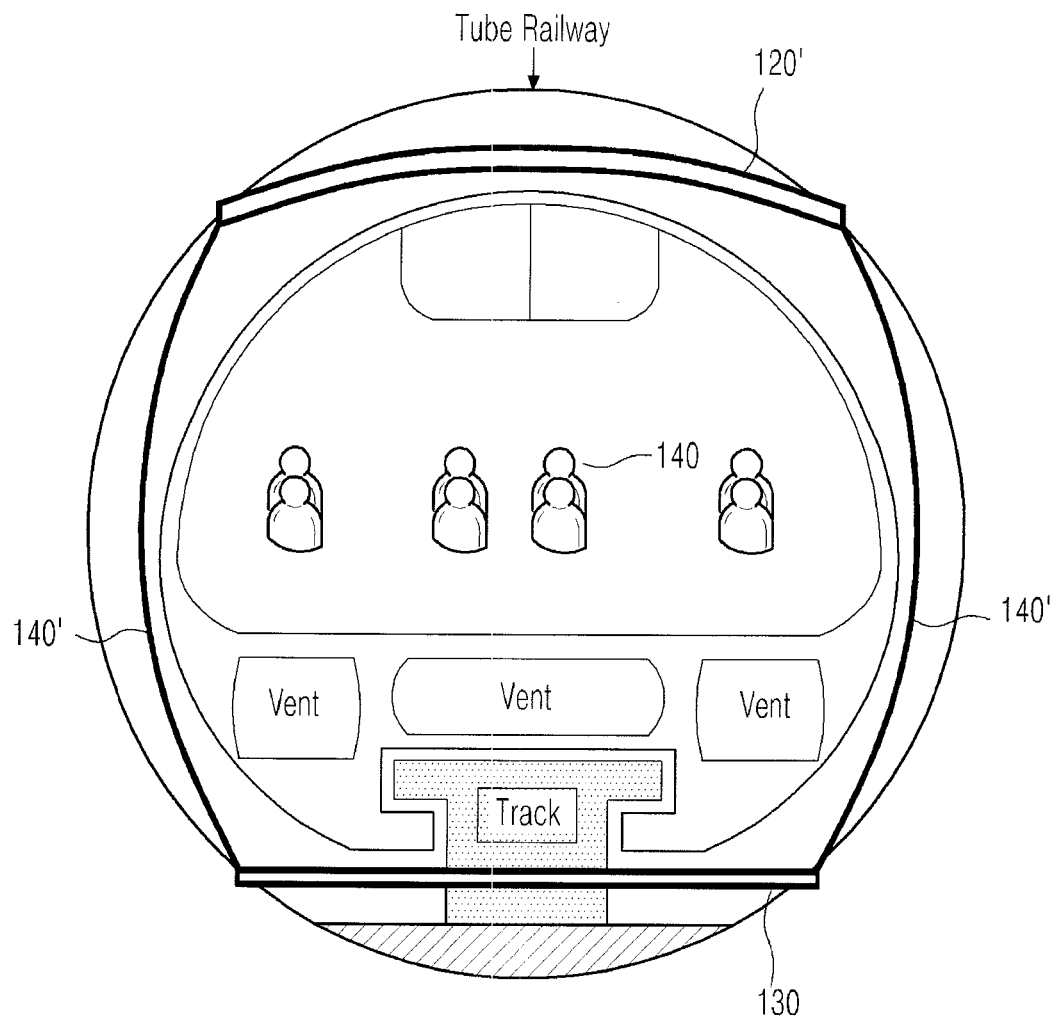
FIG. 18 shows another example in which a vertical guide structure and an upper structure are formed in a round shape according to an exemplary embodiment of the present invention.

Meanwhile, the tube railway has a circular shape, and the rolling stock generally has a round outer shape to match the shape of the tube railway. In this case, if the vertical guide structure and the upper structure of the vacuum blocking screen device are linear, they may interfere with the passing of the rolling stock (or violate the rolling stock gauge). To avoid this, as shown in FIG. 18, each of the vertical guide structure 140 and the upper structure 120 may be configured to have a round shape with a predetermined curvature.

In one example embodiment, the blocking screen 110 is formed in a nylon material having flexibility so that the blocking screen 110 can be smoothly unfolded or folded.

The controller 500 is a means for monitoring conditions of the tube railway and operating conditions of the train and controlling the operation of the vacuum blocking screen device 100 according to the monitored information and the control operation of a manager.

The controller 500 controls the vacuum blocking screen device 100 by deciding a speed at which the blocking screen 110 is unfolded or folded. The speed is decided according to an algorithm that is previously programmed on the basis of the speed of the train, the relative position of the train and the blocking screen 110 therebetween, the degree of vacuum in the tube railway passage, the seriousness of an accident, and other information including various information on external conditions and vacuum monitoring information.

Here, the blocking screen driver 160 may employ two or more means for unfolding/folding the blocking screen 110. In this case, when the operation speed of the blocking screen driver 160 is decided, a driving means for operating the blocking screen 110 may be decided accordingly.

The present invention can be applied to a means of transportation, i.e. a tube railway system which allows a train to travel in a track space, i.e. in a tube (having a diameter of about 5 m to about 10 m), sealed under vacuum (about ⅓ to about 1/1000 of atmospheric pressure) for the purpose of traveling at an ultra high speed of 400 km/h or more.

In the embodiment of the present invention, it is described that the tube railway system uses a Maglev train technology as shown in FIGS. 4 to 7. However, it should be noted that the tube railway system may be applied to a wheeled train technology as shown in FIGS. 8 to 11.

The vacuum pump 200 is a means for creating a vacuum inside the tube railway under vacuum.

The vacuum release valve means 300 is a means for partially or fully releasing the vacuum in the tube railway.

Operation of the vacuum division management system according to the present invention having the aforementioned configuration will be described below. On constructing the tube railway system of the present invention, the vacuum blocking screen device 100, as shown in FIG. 1, is installed at designated positions to allow each section to have the degree of vacuum different from each other, when needed.

In the present invention, FIG. 1 shows a longitudinal cross section of the tube railway on which the vacuum blocking screen device 100 is installed.

Figure 2A:
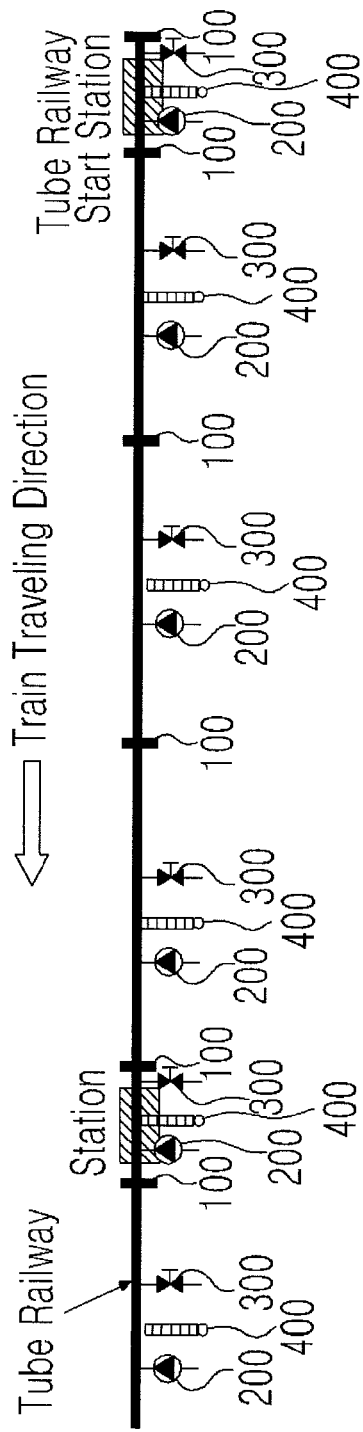
FIG. 2a is a conceptual view showing configuration of a vacuum division management system along a train service route according to an exemplary embodiment of the present invention.
Figure 2B:
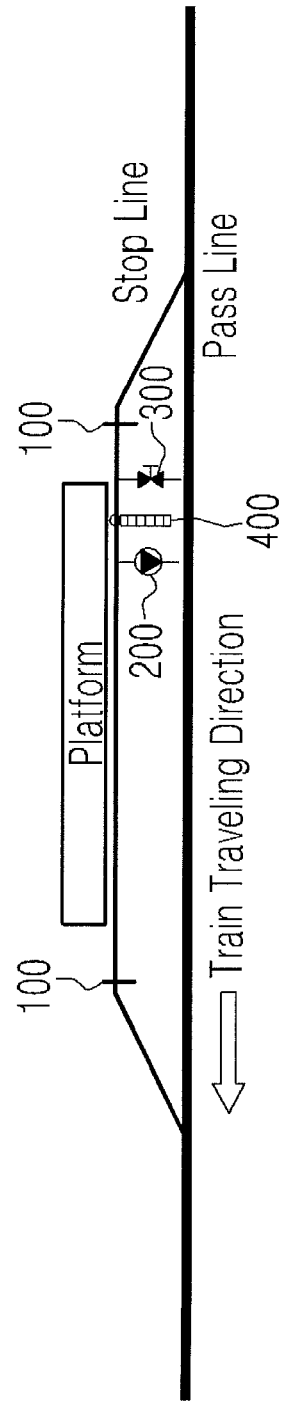
FIG. 2b is a conceptual view showing detailed configuration of a vacuum division management system according to an exemplary embodiment of the present invention having a divided section or a station section by way of example.
Figure 3A:
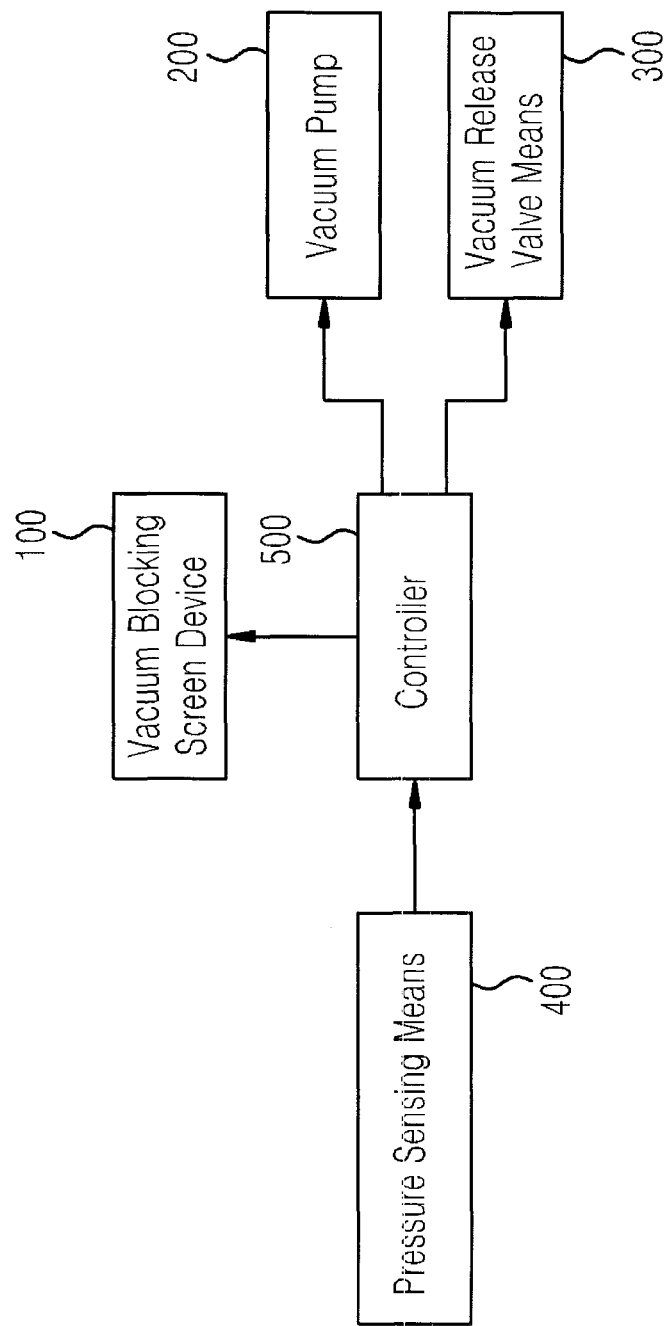
FIG. 3a is a block diagram showing configuration of a vacuum division management system for a tube railway system according to an exemplary embodiment of the present invention.
Figure 3B:
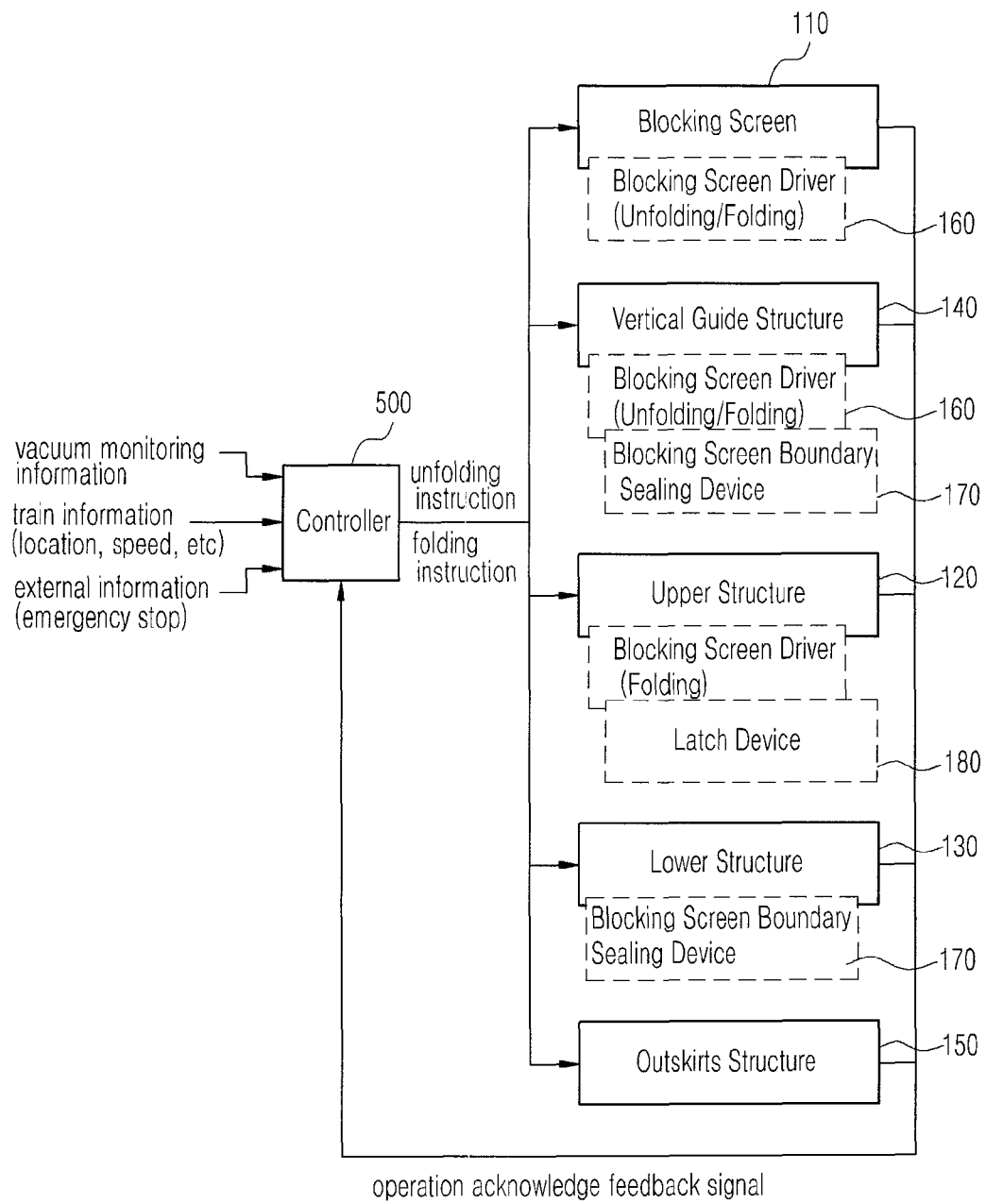
FIG. 3b is a block diagram showing configuration of a vacuum blocking screen device including a controller of a tube railway system and a flow of a control signal thereof according to an exemplary embodiment of the present invention.

Here, as shown in FIG. 2, the vacuum division management system of the present invention can be provided over an entire rail mute or at one or more certain stations.

When the loss of vacuum occurs, or when a serious problem that requires fast maintenance occurs (e.g., a sudden stop of a train due to a defect), the controller 500 controls the vacuum blocking screen device 110 installed in a corresponding section (e.g., station) of the railway mute on the basis of vacuum monitoring information, train information (location, speed, etc.), and information on external conditions of the train such as an emergency stop, thereby physically separating the corresponding section from the other sections.

The vacuum blocking screen device 100 has two states: an unfolded state and a folded state.

The folded state is a state where the blocking screen 110 is folded so as not to interfere with the passing of a train, while the blocking screen 110 is in a standby state to be unfolded anytime as shown in FIGS. 4 and 5. In the folded state, the blocking screen 110 is folded in an inner space of the upper structure 120, and the blocking screen boundary sealing device 170 is in a contracted condition. Further, the vents 152 of the outskirts structure 150 are open. Thus, a train (e.g., a Maglev train or a wheeled train) can normally pass through the section where the vacuum blocking screen device 100 is installed.

Figure 6:
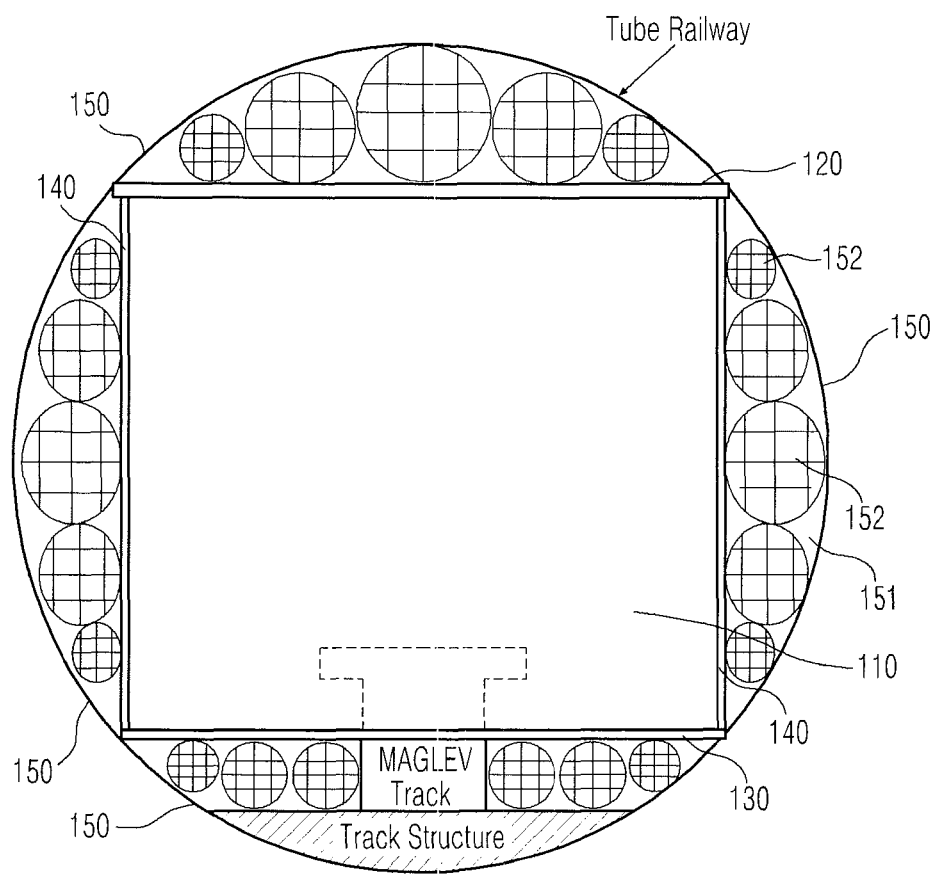
Figure 7:
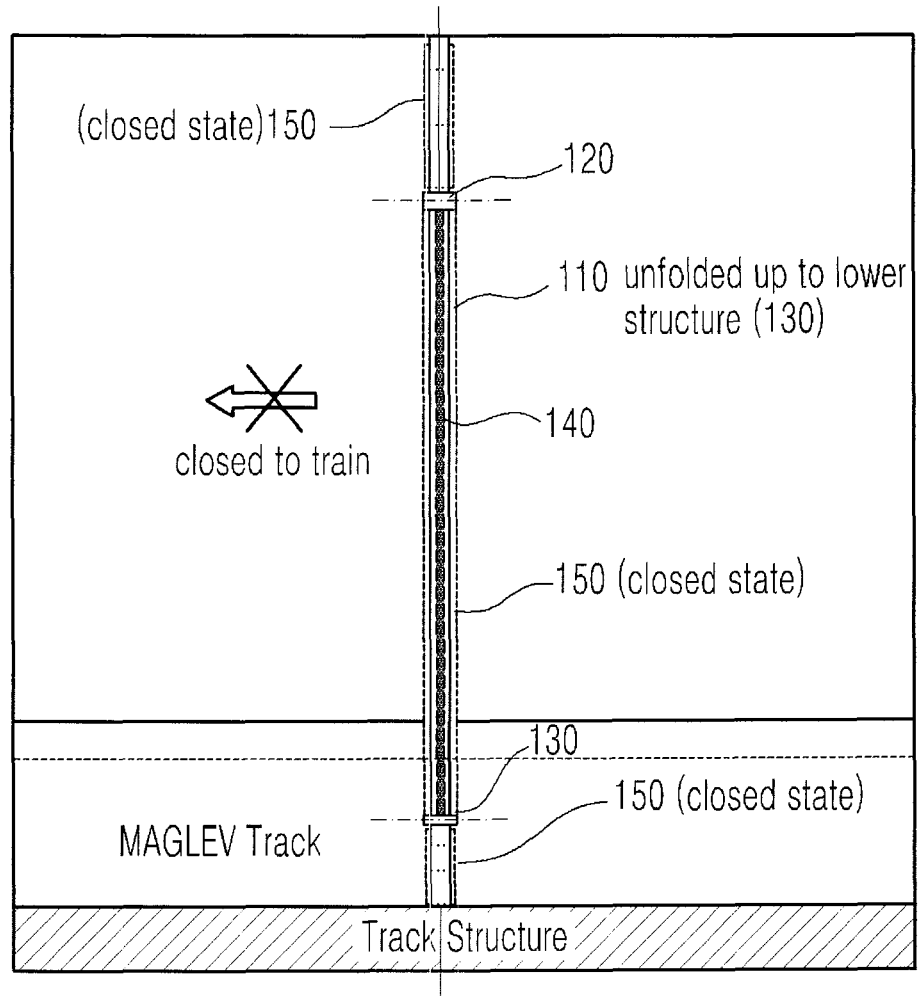
Figure 8:
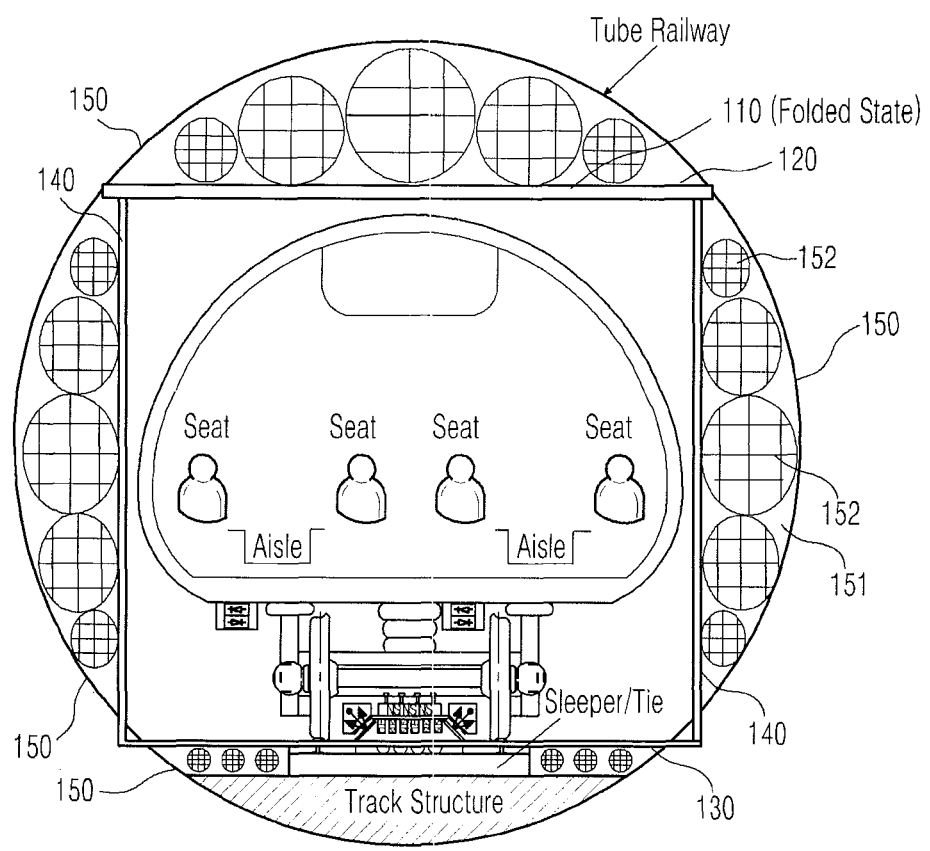
Figure 9:
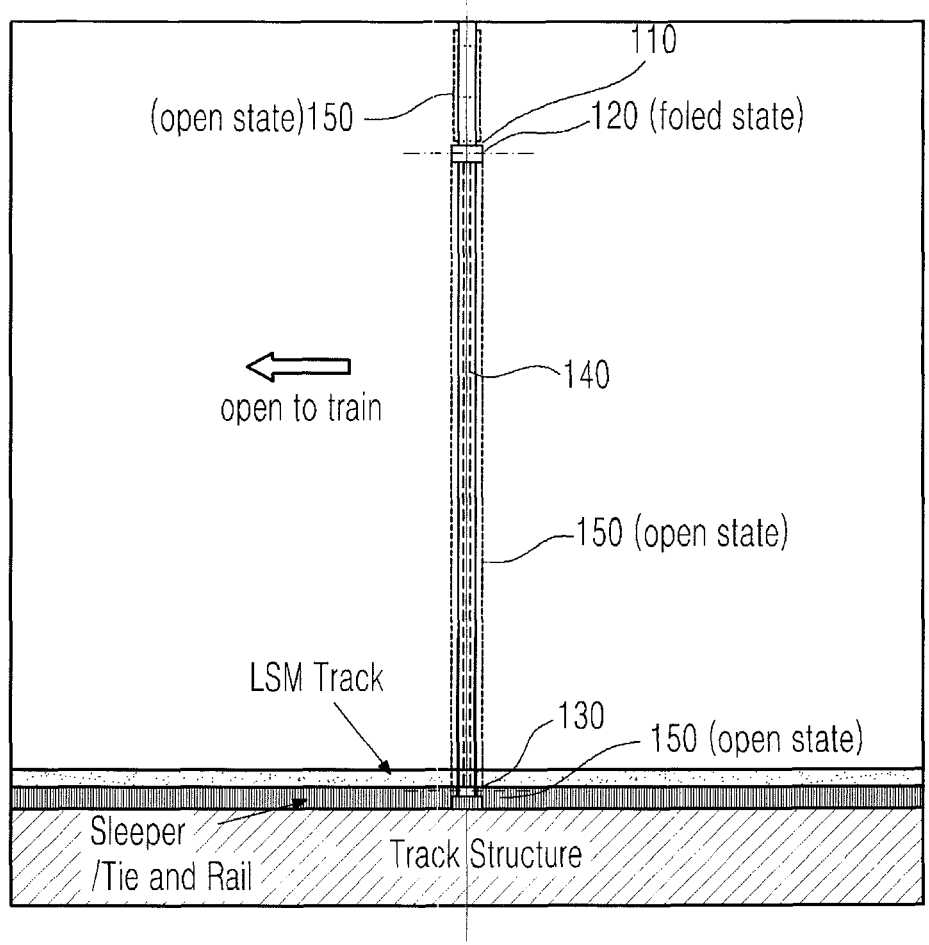
Figure 10:
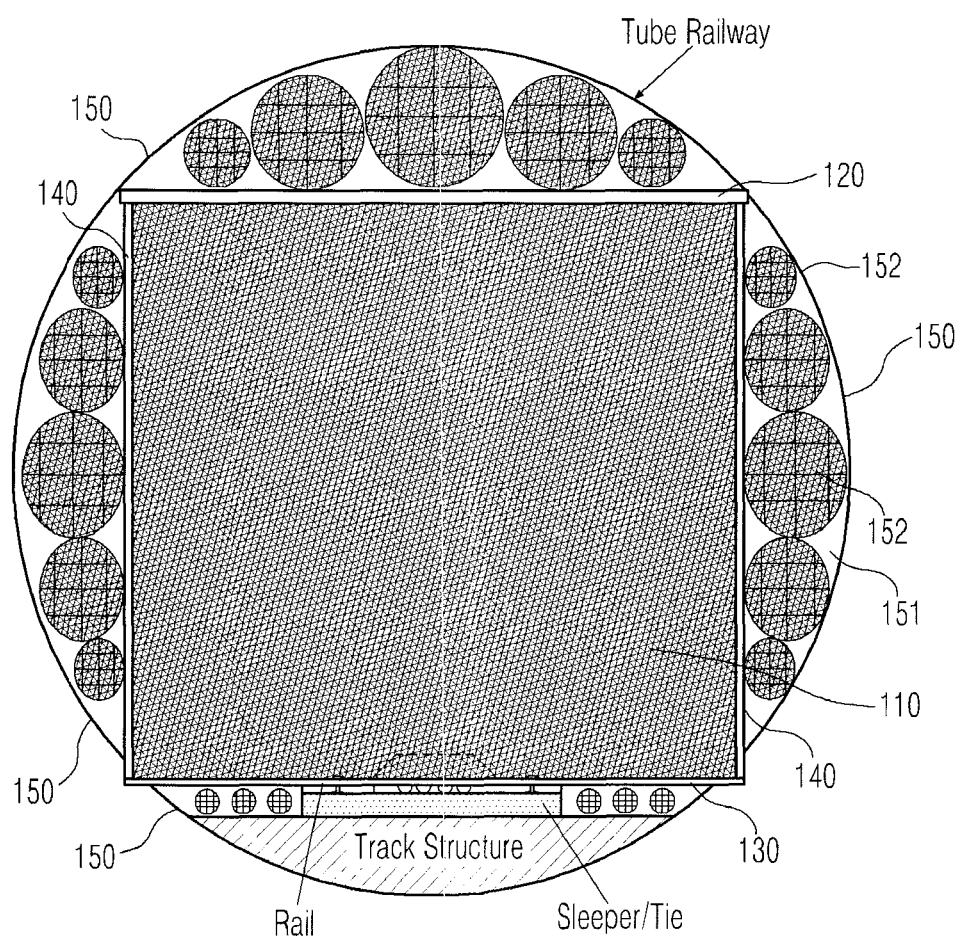
Figure 11:
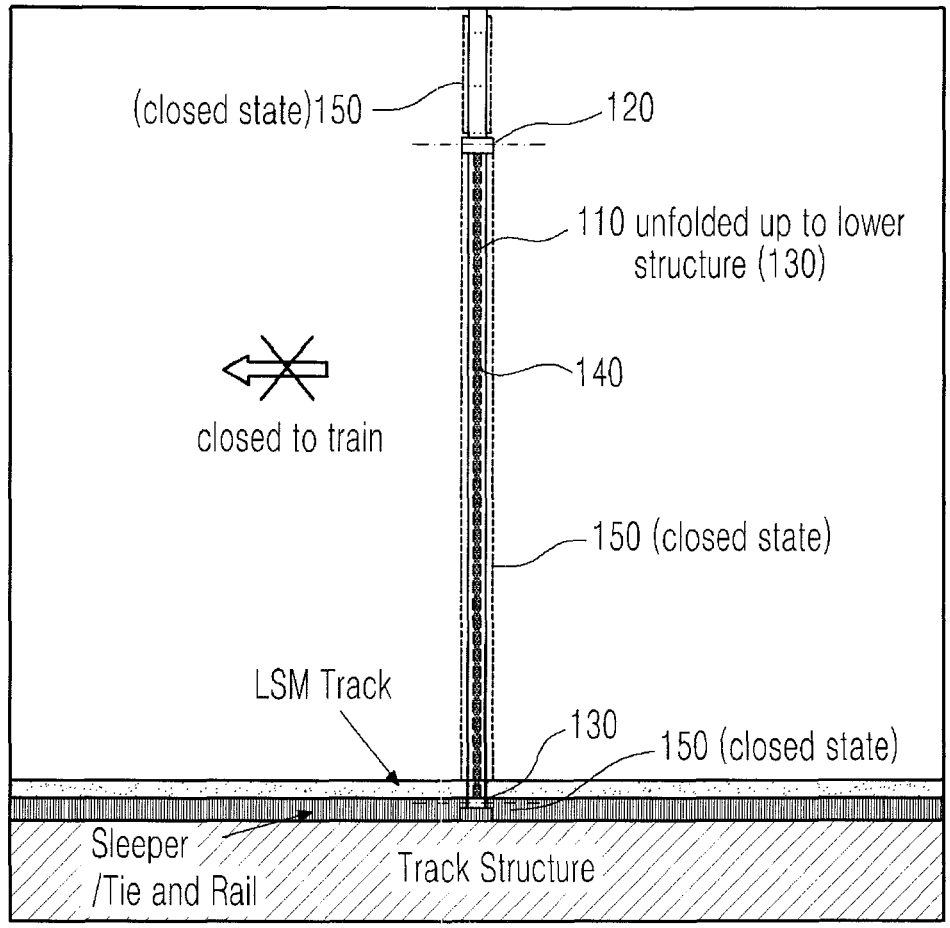
Figure 12:
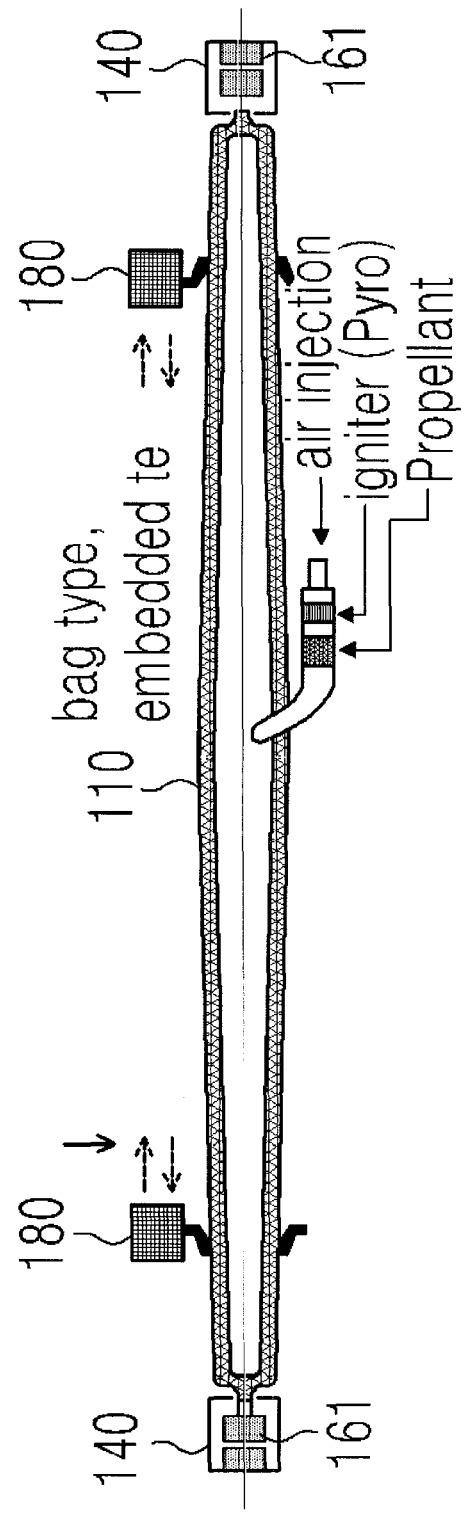
FIG. 12 is a top plan view showing configuration and arrangement of a vertical guide structure, a blocking screen, and a post-folding latch device according to an exemplary embodiment of the present invention.

In the unfolded state, the blocking screen 110 is unfolded from the upper structure 120 to the lower structure 130, and the blocking screen boundary sealing device 170 is inflated. Further, the vents 152 of the outskirts structure 150 are closed. Thus, the tube railway is tightly blocked so that air does not flow between opposite sides of the vacuum blocking screen device 100 as shown in FIGS. 6 and 7.

The blocking screen 110 is unfolded by the LSM 161 of the blocking screen driver 160 installed along the vertical guide structure.

As shown in FIG. 13, the stator winding is installed on the side of the guide track of the vertical guide structure 140, and the permanent magnet is installed on the movable body gripping the blocking screen 110. Thus, the permanent magnet serves as the rotator to transfer the blocking screen 110.

The unfolding or folding process of the blocking screen 110 is performed on the basis of an instruction of the controller 500. The controller 500 also decides the unfolding or folding speed and generates the instruction for the unfolding or folding process. The speed is decided according to an algorithm that is previously programmed on the basis of the speed of the train, the relative position of the train and the blocking screen therebetween, the degree of vacuum in the tube, the seriousness of an accident, and other information including various information on external conditions and the vacuum monitoring information.

When the unfolding instruction is received from the controller 500, the blocking screen driver 160 unfolds the blocking screen 110 from the upper structure 120, and guides the blocking screen 110 to the lower structure 130 via the vertical guide structure 140, thereby blocking the tube railway passage.

After the blocking screen 110 is completely unfolded, the blocking screen boundary sealing device 170 introduces air into each balloon 172 through the air injection port 171, thereby inflating each balloon 172. Thus, the balloons 172 press boundaries between the blocking screen 110 and the vertical guide structure 140 and between the blocking screen 110 and the lower structure 130, respectively, thereby blocking air from flowing therebetween.

Meanwhile, when the folding instruction is received from the controller 500, the blocking screen driver 160 folds the unfolded blocking screen 110, and the latch device 180 is operated to put the folded blocking screen 110 into the upper structure 120, and fixes the blocking screen for the future unfolding process.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A vacuum division management system for a tube railway system using a sealed evacuated track, the vacuum division management system comprising:
   a vacuum blocking screen device installed in a designated section of a tube railway, the vacuum blocking screen device being configured to be opened in a normal operation mode and configured to be closed to block a tube railway passage in an abnormal operation mode, such that the designated section blocked by the vacuum screen device has a degree of vacuum different from those of other sections; and
   a controller configured to monitor conditions of the tube railway and operating conditions of the train, and configured to control the vacuum blocking screen device based on the monitored conditions or a control operation,
   wherein the vacuum blocking screen device includes:
      a blocking screen configured to block the tube railway passage perpendicularly to the tube railway passage;
      an upper structure configured to hold the blocking screen in a standby state;
      a lower structure configured to seal a gap between the blocking screen unfolded from the upper structure and a lower surface of the tube railway passage;
      a vertical guide structure configured to guide the blocking screen in a downward direction when the blocking screen is unfolded;
      a blocking screen outskirts sealing part formed on outskirts of the blocking screen and configured to fill a space between the blocking screen and the tube railway passage to block a flow of air therebetween;
      a blocking screen driver configured to drive the blocking screen so that the blocking screen is unfolded from or held in the upper structure;
      a blocking screen boundary sealing device configured to block air from being circulated into a boundary between the blocking screen and the vertical guide structure; and
      a latch device installed in the upper structure configured to hold the blocking screen when being folded up under control of the controller.

2. The vacuum division management system according to claim 1, further comprising a vacuum release means configured to release the vacuum from the designated section blocked by the vacuum blocking screen device of the tube railway.

3. The vacuum division management system according to claim 1, further comprising a vacuum establishing means configured to provide the vacuum in the designated section blocked by the vacuum blocking screen device of the tube railway, wherein the vacuum establishing means includes at least one of, a vacuum pump for placing an interior of the tube railway under the vacuum or a device for connecting to an external vacuum pump.

4. The vacuum division management system according to claim 1, further comprising a pressure sensing means configured to sense pressure in the designated section closed by the vacuum blocking screen device of the tube railway.

5. The vacuum division management system according to claim 1, wherein the upper structure and the vertical guide structure have a round shape with a predetermined curvature, respectively.

6. The vacuum division management system according to claim 1, wherein the blocking screen is formed in a flexible material to allow smooth folding or unfolding of the blocking screen.

7. The vacuum division management system according to claim 1, wherein the blocking screen has a substantially quadrilateral shape and the tube railway passage has a substantially circular shape.

8. A vacuum blocking screen device for a tube railway system, the vacuum blocking screen device comprising:
   a blocking screen configured to block a passage of a tube railway;
   an upper structure configured to hold the blocking screen in a standby state;
   a lower structure configured to seal a gap between the blocking screen unfolded from the upper structure and a lower surface of the tube railway passage;
   a vertical guide structure configured to guide the blocking screen in a downward direction when the blocking screen is unfolded;
   an outskirts structure configured to fill a gap between the tube railway and the blocking screen;
   a blocking screen driver installed in the vertical guide structure and configured to drive the blocking screen to allow the blocking screen to be unfolded from or folded into the upper structure;
   a blocking screen boundary sealing device configured to block air from flowing into a boundary between the blocking screen and the vertical guide structure; and
   a latch device installed on the upper structure and configured to hold the blocking screen when being folded up under control of a controller.

9. The vacuum blocking screen device according to claim 8, wherein the blocking screen is formed in, at least one of, a curtain-like single layered screen type or a bag type.

10. The vacuum blocking screen device according to claim 9, wherein the blocking screen is formed in, at least one of, a nylon material coated with synthetic rubber or a material similar to the nylon material.

11. The vacuum blocking screen device according to claim 8, wherein the blocking screen is formed in a bag type, and has tethers embedded therein to have a desired shape when the blocking screen is opened.

12. The vacuum blocking screen device according to claim 11, wherein the blocking screen is formed in, at least one of, a nylon material coated with synthetic rubber or a material similar to the nylon material.

13. The vacuum blocking screen device according to claim 8, wherein the blocking screen is formed in, at least one of, a nylon material coated with synthetic rubber or a material similar to the nylon material.

14. The vacuum blocking screen device according to claim 8, wherein the outskirts structure includes a structure designed based on a shape of a residual space between outer surfaces of the upper structure, the vertical guide structure and the lower structure and an inner surface of the tube railway passage to fill the residual space, and a plurality of vents, each of which is formed in the structure, has a circular or elliptical shape, and includes a balloon, an air injection port, and lattices for guiding a shape of the balloon when the balloon is inflated, whereby the vent is closed by the balloon into which air is injected by compressed air or pyrochemical reaction of a propellant, and is opened by the balloon from which the air is discharged.

15. The vacuum blocking screen device according to claim 8, wherein the blocking screen driver is installed in the vertical guide structure, and includes a linear synchronous motor (LSM) in which winding for a stator is installed on a side of a guide rail of the vertical guide structure and a permanent magnet is installed on a movable body that is connected to a leading end of the blocking screen to hold the blocking screen.

16. The vacuum blocking screen device according to claim 8, wherein the blocking screen is formed in a bag type, and the blocking screen driver is driven by a gas diffusion method utilizing a gas generating means for generating gas to inflate the blocking screen at a high speed and a gas injecting means for injecting the generated gas into the bag-type blocking screen.

17. The vacuum blocking screen device according to claim 16, wherein the gas generating means is configured to cause a propellant to undergo a pyrochemical reaction to generate a large quantity of gas (azide type) or activate gas compressed in the blocking screen along with the pyrochemical reaction of the propellant (hybrid type).

18. The vacuum blocking screen device according to claim 8, wherein the blocking screen boundary sealing device includes a balloon installed on the blocking screen outskirts sealing part to block the blocking screen outskirts sealing part, and an air introducing means for introducing and discharging air through an air injection port to inflate or deflate the balloon to perform airtight control on the blocking screen outskirts sealing part.

19. The vacuum blocking screen device according to claim 8, wherein the blocking screen boundary sealing device is configured to generate a large quantity of gas using a method of causing a propellant to undergo a pyrochemical reaction or a method of activating compressed gas along with the pyrochemical reaction of the propellant, configured to inject the gas into a balloon through air injection port to inflate the balloon, and configured to perform airtight control on, at least one of, a boundary between the blocking screen and the vertical guide structure or a boundary between the blocking screen and the lower structure.

20. The vacuum blocking screen device according to claim 8, wherein the upper structure and the vertical guide structure have a round shape with a predetermined curvature, respectively.

21. The vacuum blocking screen device according to claim 20, wherein the blocking screen is formed in a material having flexibility to allow smooth folding or unfolding of the blocking screen.

\* \* \* \* \*